(12) United States Patent
Kopp

(10) Patent No.: US 7,116,237 B2
(45) Date of Patent: Oct. 3, 2006

(54) PRESSURE MEASURING DEVICE

(75) Inventor: Thomas Kopp, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/859,574

(22) Filed: Jun. 3, 2004

(65) Prior Publication Data
US 2004/0254748 A1     Dec. 16, 2004

(30) Foreign Application Priority Data
Jun. 11, 2003    (DE) ................ 103 26 249

(51) Int. Cl.
*G08B 21/00*   (2006.01)

(52) U.S. Cl. ............... 340/626; 340/632; 340/825.52; 340/854.3; 702/45; 702/99; 702/138; 358/504; 358/523

(58) Field of Classification Search ........... 340/626, 340/632, 825.52, 854.3, 853.1, 611, 614; 175/40; 358/504, 523; 702/45, 12, 24, 47, 702/67, 99, 138
See application file for complete search history.

(56) References Cited

U.S. PATENT DOCUMENTS

| 4,685,066 | A | * | 8/1987 | Hafele et al. | 702/50 |
| 5,365,462 | A | * | 11/1994 | McBean, Sr. | 702/91 |
| 5,377,128 | A | * | 12/1994 | McBean | 702/91 |
| 5,412,574 | A | * | 5/1995 | Bender et al. | |
| 5,598,103 | A | * | 1/1997 | Lew et al. | 324/662 |
| 5,940,290 | A | * | 8/1999 | Dixon | 700/9 |
| 6,643,575 | B1 | * | 11/2003 | Ishida et al. | 701/45 |
| 6,766,817 | B1 | | 7/2004 | Da Silva | |

* cited by examiner

Primary Examiner—Thomas Mullen
Assistant Examiner—Daniel Previl
(74) Attorney, Agent, or Firm—Nath & Associates PLLC; Jerald L. Meyer; Derek Richmond

(57) ABSTRACT

The invention relates to a pressure-measuring device (M1) with a controller (C) for controlling the functions of the measuring device (M1) and/or for processing measured data, a sensor (S1) for measuring a variable (p1) to provide first measured data (I1), and an output interface (IA1, D1) for outputting the measured data (I1). In order that additional measured data of a second measuring device (M2) can be easily processed without using another external data processor or an arrangement with a capillary line in the case of a differential pressure-measuring device, it is proposed that the measuring device (M1) have a communications interface (I2C1, I2C) for an additional, second measuring device (M2) with another sensor (S2) for measuring a variable (p2) to provide second measured data (I2), and, when the second measuring device (M2) is connected via the communications interface (I2C1, I2C, I2C2) or the second measuring device (M2) is activated, the controller (C) initiates a reception of the second measured data (I2), a joint processing of the first and second measured data (I1, I2; ΔI=I1−I2) and an output of jointly processed measured data (ΔI).

14 Claims, 1 Drawing Sheet

PRESSURE MEASURING DEVICE

FIELD OF THE INVENTION

The invention relates to a pressure-measuring device with the features outlined in the preamble of claim 1, a measuring system with at least two such pressure-measuring devices according to the features in claim 11, and a method for operating such a pressure-measuring device and measuring system with the features in claim 14.

BACKGROUND

Differential pressures must be measured in numerous technical applications. A generally known differential pressure-measuring device has a pressure sensor. The pressure sensor has two pressure- and separating membranes, which are spaced apart and each allocated to one delivery connection. A pressure-balancing medium is located in the space between the separating membranes. Situated on the side of the separating membranes facing away from the pressure-balancing medium is a respective space in which a first pressure prevails on the side of the first separating membrane, and a second pressure prevails on the side of the second separating membrane. In addition, the differential pressure-measuring device has integrated plate-type capacitors, whose capacity depends on the prevailing pressures. The capacity values for the plate-type capacitors are subjected to a capacitive evaluation to convert the corresponding pressures into a current signal, e.g., with values ranging from 4 to 20 mA, by finding the electrical difference.

This kind of structurally favorable embodiment makes it possible to measure the differential pressure of gases in piping that is connected to the differential pressure-measuring device, for example. The measurement of liquids with precipitating solids requires that a capillary line be arranged in each differential pressure-measuring device to avoid obstructions in the area of the delivery connections.

An embodiment of this type entails a correspondingly higher complexity of design and expense. When measuring a differential pressure between a container floor and container cover to determine a fill level with superposed pressure, the rising capillary also gives rise to a hydrostatic column, and hence a measuring error.

Another embodiment for a known differential pressure-measuring device consists of two conventional standard pressure-measuring devices with frontal, flush-mounted sensors each having a current output as an output for outputting measured data. The measured data are relayed to a separate electronic evaluator, wherein the electronic evaluator finds the difference between the currents. In this case, the difference between the current signal of the first pressure-measuring device and the current signal of the second pressure-measuring device is found with an analog circuit or a microprocessor. This kind of arrangement does not require a capillary line, thereby eliminating the otherwise resultant measuring error. However, the disadvantage here is that two stand-alone measuring devices and an additional evaluating device with electronic evaluator connected thereto are required, making installation complicated. The provision of a separate evaluating device results in additional costs.

SUMMARY

The object of the invention is to provide a pressure-measuring device that enables the processing of various measured data, in particular a measuring system for finding the differential pressure with simple means. A method for operating such a measuring device or such a measuring system is advantageously to be provided.

This object is achieved by a pressure-measuring device with the features in claim 1, a measuring system with the features in claim 11 and a method for operating such a measuring device and measuring system with the features in claim 14.

One particularly preferred pressure-measuring device has a controller for controlling the measuring device functions, an output interface for outputting measured data, and a sensor for measuring a physical variable as first measured data. In this regard, the pressure-measuring device functions as a standard measuring device for determining a pressure value via the sensor, wherein a corresponding signal is output via the output interface. To enable differential pressure determination, the pressure-measuring device has a communications interface with an additional, second measuring device, which is advantageously set up like the first pressure-measuring device. In particular, the second measuring device also has a controller, a separate output interface for outputting measured data, and a separate sensor for measuring a physical variable as the second measured data, along with a communications interface. The two pressure-measuring devices are interconnected via the communications interface, so that communication can take place between the two pressure-measuring devices. In addition to the transmission of measured data, control data are best also exchanged between the two pressure-measuring devices, and in particular between their controllers. In order to jointly process the measured data, in particular to find the differential pressure, one of the two pressure-measuring devices transmits its measured data via the communications interface to the other pressure-measuring device. The receiving pressure-measuring device or its controller initiates the reception of measured data and the joint processing of received measured data and that recorded by its own sensor, after which the processing result of joint processing is output as jointly processed measured data. In addition to the capability of the controller to itself jointly process the received measured data and its own measured data, the controller can also activate a corresponding additional data processor accordingly.

Therefore, a corresponding measuring system consists of at least two physically separate pressure-measuring devices for measuring a respective physical variable, wherein the two measuring devices are interconnected via a communications interface, which is used to transmit at least the measured data of the one pressure-measuring device to the other pressure-measuring device. The pressure-measuring device that receives the measured data is correspondingly designed to process the received measured data together with the measured data it measured itself, in particular to determine and output a differential pressure value.

Advantageous embodiments are described in the subclaims.

While the pressure-measuring device is a standard pressure-measuring device that outputs data measured by its own sensor via the output interface and, when connecting a second pressure-measuring device and receiving second measuring data from the second pressure-measuring device, finds a differential pressure for the first and second measured data and outputs it via the output interface, it is advantageously also possible for the pressure-measuring device, in addition to the jointly processed measured data, i.e., in particular the differential pressure, to output its own measured data and, if necessary, the received measured data, in the case of a second connected pressure-measuring device. The controller advantageously has a program for automatically detecting the connection of a second measuring device, so that a switch is automatically made from a first operating mode involving the measurement of a pressure via its own sensor and output of corresponding measured data to a second operating mode in which differential pressure data are generated and provided for output in place of or in addition to its own first measured data.

The output interface can advantageously be designed for transmitting the measured data measured by a separate sensor and/or for transmitting the jointly processed measured data. In this case, the output interface can be designed as a stand-alone interface separate from the communications interface. For example, this enables the analog measured data output of measured data from a separate sensor or of jointly processed measured data, and on the other hand the transmission of digital measured data and, if necessary, control data via the communications interface. A configuration is also possible in which the output interface is designed as a component of the communications interface. In such an arrangement, the communications interface is used for communicating data between two measuring devices when a second measuring device is connected, while the communications interface is used for outputting the measured data measured by a separate sensor during operation as a stand-alone measuring device. In this case, the communications interface can be analog or digital in design, depending on the preferred intended application.

In one advantageous embodiment other than those embodiments involving a controller, in particular a microprocessor, which processes measured data and received measured data in addition to controlling essential functions of the measuring device, the measuring device incorporates a separate measured data processor, in particular a subtraction device, for processing the data measured by its own sensor as well as the received measured data. A differentiation between the controller and this kind of measured data processor is advantageous in particular during the digital operation of the controller and analog operation of the measured data processor.

In its simplest embodiment, the communications interface can be comprised of a simple cable connection for transmitting analog measured data. However, the preferred communications interface consists of a standardized bus system, for which purpose the measuring devices each have a correspondingly equipped interface device. Radio-assisted interfaces can here also be used in addition to cable-assisted interfaces.

In measuring systems consisting of two measuring devices interconnected via the communications interface, one of the two measuring devices or the controller thereof expediently functions as the master, while the other measuring device functions as the slave. The measuring device that functions as the master advantageously also handles the joint processing of measured data. In addition to using two identical measuring devices that can each in principle act as master or slave, it is also possible to use standard measuring devices that transmit the recorded measured data via the communications interface to a special measuring device that processes the received measured data with separately recorded measured data.

The measuring devices advantageously have display units that display the value measured by their own sensor during stand-alone operation. When the measuring devices are connected via the communications interface, the measuring device that jointly processes the received measured data along with that measured on its own displays the processed data on the display unit instead of or in addition to the data measured on its own. During use as a pressure-measuring device in piping on either side of a filter, the display of one of the measuring devices can therefore display the pressure prevailing inside the piping, while the display of the other measuring device displays the differential pressure. In particular in the case of measuring devices arranged in close proximity to each other, this eliminates the need for providing a separate display for displaying the jointly processed measured data.

BRIEF DESCRIPTION OF THE DRAWINGS

An exemplary embodiment will be explained in greater detail below based on the drawing. Shown on.

DETAILED DESCRIPTION

Figure 1:
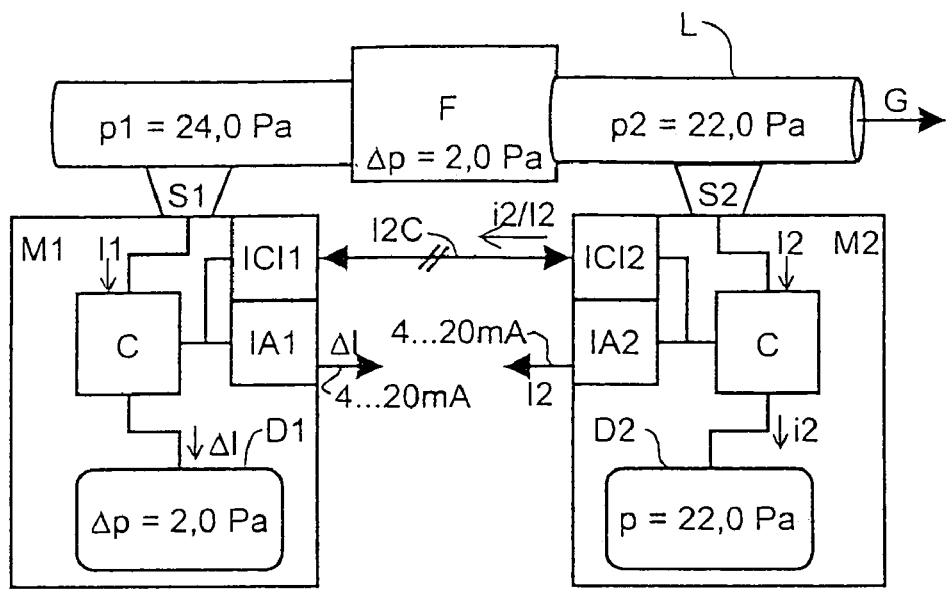
FIG. 1 is an exemplary measuring system with two pressure-measuring devices interconnected via a communications interface.

FIG. 1 represents an exemplary measuring system with two measuring devices M1, M2, which are connected to piping L. A medium G, e.g., a liquid or a gas, flows through the piping. The medium G flows through a filtering device F, which is incorporated into the piping L. In systems like these, it is typical for a first pressure p1 to prevail in the piping L on the inflow side that exceeds a second pressure p2 on the outflow side of the filtering device F. In the exemplary embodiment shown, a pressure difference $\Delta p$ of 2.0 Pa is obtained via the filtering device F from the exemplary first pressure p1 of 24.0 Pa to the second pressure p2 of 22.0 Pa. In cases where the filtering device F filters out increasingly more particles from the medium G over time and becomes clogged, the pressure difference $\Delta p$ rises. Therefore, the pressure difference $\Delta p$ is an indicator for necessary maintenance of the filtering device F.

The first measuring device M1 has a first sensor S1 arranged on the inflow side of the piping L to detect and measure the first pressure p1. The second measuring device M2 also has a sensor S2 arranged on the outflow side of the piping L to measure the second pressure p2.

The two measuring devices M1, M2 each have a controller C, e.g., a microprocessor, which is used to control the measuring device M1, M2. At the same time, the controller C can preferably subject the measured data I1, I2 provided by the sensor S1, S2 to initial evaluation and processing.

The measured data I1, I2 provided by the sensor S1, S2 are preferably present as analog voltage or current signals. However, it is also possible to use sensors S1, S2 that already effect a conversion into digital signals. The measured data I1, I2 are routed to an output interface IA1, IA2; D1, D2 either directly or via the controller C. A preferred output interface IA1, IA2 is used for the digital, or preferably analog, output of the measured data I1, I2 as current values in a range of 4–20 mA, for example. Output can take place here as a continuous measured data signal, or as a sequence of discrete measured data values. Additionally or alternatively, the output interface can consist of a display D1, D2 that visually displays the measured data.

In addition, the measuring devices M1, M2 have a communications interface ICI1, ICI2 to interconnect the two measuring devices M1, M2 as shown. The connection can here take the form of a known cable-assisted or radio-assisted transmission link. The communications signals can be transmitted in analog or digital form depending on the selected interface form. In particular, a communications interface I2C in the form of a known I2C bus developed in the early 80's by Philips is especially preferred. The communications interface ICI1, I2C, ICI2 is used for transmitting control data and measured data I2. Control data are transmitted in order to synchronize the two measuring devices M1, M2, harmonize them with respect to the respective functional capabilities, and establish one of the measuring devices M1 as the primary or master station and the other measuring device M2 as the secondary or slave station. Accordingly, the preferred bus I2C is designed for the bi-directional transfer of control signals. In principle, the bi-directional transmission of measured data I1, I2 is also possible.

According to alternative embodiments, however, a single communications interface that serves only to transmit measured data I2 from one of the measuring devices M2 to the other measuring device M1 is sufficient. The output interface IA2 of one of the measuring devices M2 can be used in place of a separate communications interface for these purposes, wherein the corresponding other measuring device M1 that functions as the master then has at least one input interface for receiving the measured data I2 as the communications interface. In principle, then, it is enough to provide a single interface per measuring device M1, M2.

In the preferred exemplary embodiment, the controller C of the measuring devices, in particular measuring device M1, has a program used for automatically detecting that the second and active measuring device M2 is connected to the communications interface ICI1. In this case, the controller C establishes that the first measuring device M1 functions as the master, and the second measuring device M2 functions as the slave. This information is preferably imparted to the second measuring device M2 via the communications interface ICI1, I2C, ICI2, so that the second measuring device M2 does not also function as a master.

Which of the measuring devices M1, M2 functions as the master can be determined in a manner known in the art. In particular, the measuring devices M1, M2 can determine this among themselves.

In an especially preferred embodiment, the master station, i.e., the first measuring device M1, takes over joint processing of the first measured data I1 provided by the separate sensor S1 and the second measured data I2 received by the second measuring device M2 via the communications interface ICI1, I2C, ICI2. In the case of a pressure-measuring device system, the joint processing of first and second measured data I1, I2 preferably involves subtraction. The subtraction operation results in differential measured data $\Delta I = I1 - I2$, which represent a differential pressure $\Delta p = p1 - p2$.

In a simple embodiment, the second measured data I2 are output by the second measuring device M2 via the output interface IA2, and also displayed on its display D2. By contrast, the first measuring device M1 outputs the differential measured data $\Delta I$ via its output interface IA1, and displays the differential measured data $\Delta I$ on the display D1. In the case of the described piping L with filtering device F to be monitored, the two displays D2, D1 can be used to easily read the pressure value I2 of the second pressure p2 in the outflow section of the piping L on the one hand, and the differential value $\Delta I$ of the differential pressure $\Delta p$ via the filtering device F. These two values are also available via the output interfaces IA2, IA1 and/or via the communications interface ICI1, ICI2 for readout or remote transmission purposes.

In the embodiment according to FIG. 1, then, two standardizable pressure-measuring devices are interconnected, acting as stand-alone pressure-measuring devices without a corresponding communications link I2C, and each providing the pressure value p1, p2 measured via the separate sensor S2, S1 as measured data I1, I2 and outputting it via an output interface IA1, IA2 and/or a display D1, D2. When the two measuring devices M1, M2 are connected via the communications interface I2C, one of the two measuring devices switches to a master function with the help of a suitable control program of the controller C, while the other measuring device M2 switches to a slave function. The measuring device M1 with the master function automatically calculates the differential measured data $\Delta I$ from the separate measured data I1 and the measured data I2 received from the other measuring device M2, to then output and/or display said differential measured data. After terminating the communications link via the communications interface I2C, both measuring devices M1, M2, in particular the first measuring device M1, switch back to the base functionality of a stand-alone measuring device.

Figure 2:
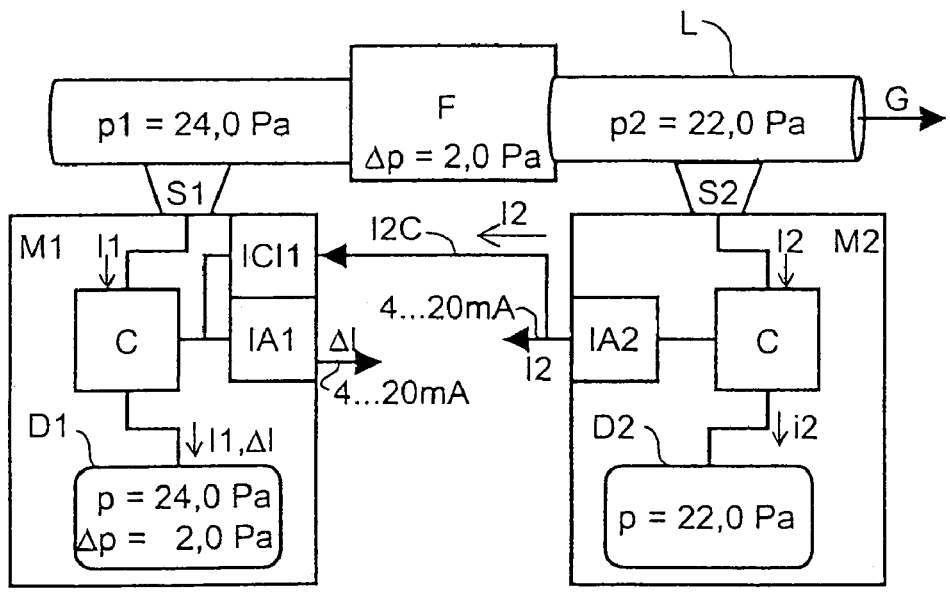
FIG. 2 is this kind of system without a bi-directional communications link between the two measuring devices.

Drawing upon essentially identical elements to those in FIG. 1 in terms of structure and function, FIG. 2 presents another exemplary embodiment in which only one of the two measuring devices M1 has the special functionality involving the joint processing of measured data I1, I2, while the other measuring device M2 is a standard measuring device that outputs the acquired measured data I2 via a suitable output interface IA2. The first measuring device M1 having the capability to jointly process measured data correspondingly exhibits an interface ICI1 suitably configured to receive second measured data I2 of the second measuring device M2. This case can again involve in particular a special communications interface ICI1 or a combined input and output interface for receiving outside second measured data I2 and outputting its own data, in particular its own measured data I1 and differential measured data $\Delta 1$.

In the embodiment shown, the first measuring device has an enlarged display D1, which displays the jointly processed measured data $\Delta I = I1 - I2$ in addition to its own first measured data D1. Naturally, it is also possible to have an alternating display, or to display only the differential measured data. The received second measured data I2 can also be displayed. These output and display capabilities for only one kind of measured data or processed measured data or the combined output of various measured data and processed measured data can naturally also be applied to the first embodiment.

A measuring system without special additional evaluating devices with a separate electronic evaluator is therefore made possible. A capillary line need also not be used between the sensors of the two measuring devices, thereby enabling a reduction in measuring errors, along with a cost-effective design.

The interfaces can here be provided as a combined interface or separate interfaces. In particular, it is possible to provide a current output in the form of a twin wire for outputting the straight measured data I1, I2 or the processed measured data $\Delta I$ on the one hand, and to provide a digital interface as the communications interface I2C.

The integrated program automatically detects when an additional measuring device that has a similar design or supplies suitable data is connected to the bus interface I2C, and automatically switches to a program mode for jointly processing inherent and received measured data I1, I2. In addition to the automatic switchover, a display can also take place to request external switchover by service personnel, for example.

When connecting two measuring devices M1, M2 of identical design, the integrated program in the first measuring device M1 determines that the latter will act as the master station and perform a subtraction function, for example. The difference is correspondingly calculated from the digital value corresponding to the first pressure p1 or first measured data I1 minus the digital value of the second pressure p2 or the second measured data I2, and a current $\Delta I$ correspondingly proportional to the differential pressure $\Delta p$ is output via the output interface IA1 and/or displayed via the display D1. The integrated program of the second measuring device establishes that the latter functions as the slave station, and calculates and provides a digital value i2 for the value of the second measured data I2 for transmission via the communications interface I2C to the first measuring device M1. In addition, a current I2 proportional to the second measured data I2 is generated, and output via the output interface IA2 and/or displayed via the display D2.

In the measuring system shown, the differential pressure is measured for monitoring the filtering device F. An increasing pressure difference $\Delta p$ over the filtering device F indicates an increasing contamination of the filtering device F. These kinds of measuring systems can also be used for other applications. For example, the differential pressure can be measured for ascertaining the fill level in a container with superposed gas pressure. The differential value for the first pressure acquired by the first pressure measuring device and for the second pressure acquired by the second pressure measuring device M2 is used to determine the fill level of the container, and output it via the output interface IA1 using a proportional current value. The measured values can be displayed on an optional display, either directly in the corresponding pressure values, in current values, or, given a difference, in percentages.

The invention claimed is:

1. Pressure-measuring device (M1; M2) with
   a controller (C) for controlling the functions of the measuring device (M1; M2) and/or for processing measured data;
   a sensor (S1) for measuring a variable (p1) for providing first measured data (I1);
   an output interface (IA1, D1) for outputting the measured data (I1); characterized in that
   the measuring device (M1) has a communications interface (I2C1, I2C) for an additional, second measuring device (M2) with another sensor (S2) for measuring a variable (p2) to provide second measured data (I2), and is designed for receiving the second measured data (I2; i2), jointly processing the first and second measured data (I1, I2; i2; $\Delta I=I1-I2$), and outputting the jointly processed measured data ($\Delta I$) when the second measuring device (M2) is connected via the communications interface (I2C1, I2C, I2C2) or the second measuring device (M2) is activated.

2. Measuring device (M1; M2) according to claim 1, in which the controller (C) is designed to initiate an output of the jointly processed measured data ($\Delta I$) and the first measured data (I1) given an active connection of the second measuring device (M2).

3. Measuring device (M1; M2) according to claim 1, in which the controller (C) is designed to initiate an output of the first measured data (I1) given an absent or inactive connection of the second measuring device (M2).

4. Measuring device (M1; M2) according to claim 1, in which the controller (C) is designed for automatically detecting the connection or activation of the second measuring device (M2).

5. Measuring device (M1; M2) according to claim 1, in which the output interface (IA1; IA2) is designed for physically outputting the measured data (I1; I2) and/or the jointly processed measured data ($\Delta I$).

6. Measuring device (M1; M2) according to claim 1, in which the output interface (IA1; IA2) is designed as a component of the communications interface (ICI1; ICI2).

7. Measuring device (M1; M2) according to claim 1, in which the output interface (IA1; IA2) is designed separately from the communications interface (ICI1; ICI2).

8. Measuring device (M1; M2) according to claim 1, in which the output interface (IA1, ICI1; IA2, ICI2) for the measured data (I1; I2) and the output of jointly processed data ($\Delta I$) is designed as an analog data output.

9. Measuring device (M1; M2) according to claim 1, in which the output interface (IA1, ICI1; IA2, ICI2) for the measured data (I1; I2) and the output of jointly processed data ($\Delta I$) is designed as a digital data output, in particular as an I2C bus.

10. Measuring device (M1; M2) according to claim 1, with a measured data processor (C), in particular a subtraction device for processing the first and second measured data (I1, I2) and providing the jointly processed measured data ($\Delta I$).

11. Measuring system with at least two separate pressure measuring devices (M1, M2) each for measuring a variable (p1, p2), wherein at least one of the measuring devices (M1) is designed according to claim 1, and wherein the two measuring devices (M1, M2) are interconnected via a communications interface (I2C) for transmitting at least measured data (I2; i2).

12. Measuring system according to claim 11, in which the first measuring device (M1), in particular the controller (C) of the first measuring device (M1), functions as the master for purposes of communicating via the communications interface (I2C) and allocating the joint processing of measured data (I1, I2), and the second measuring device (M2), in particular the controller (C) of the second measuring device (M2), functions as the slave.

13. Measuring system according to claim 11, in which each of the measuring devices (M1, M2) is assigned a display (D1, D2) as an output interface, and, during the joint processing of measured data (I1, I2), the jointly processed measured data ($\Delta I$) are displayed on the display (D1) of the first measuring device (M1) in the first measuring device (M1), and the second measured data (I2) are displayed on the display (D2) of the second measuring device (M2).

14. Method for operating a measuring system according to claim 11 and/or for operating a pressure-measuring device (M1), in which
   measured data (I1) are acquired and provided in a first measuring device (M1), and
   first measured data (I1) are output from the first measuring device (M1) via an output interface (I1, ICI1, D1), characterized in that
   second measured data (I2, i2) of a second measuring device (M2) are received by the first measuring device (M1),
   the acquired first measured data (I1) and received second measured data (I2, i2) are jointly processed in the first measuring device (M1), and
   measured data ($\Delta I$) processed by the first measuring device via the output interface (I1, D1) when receiving second measured data (I2, i2) and jointly processing the first and second measured data are output.

* * * * *